Figure 1:
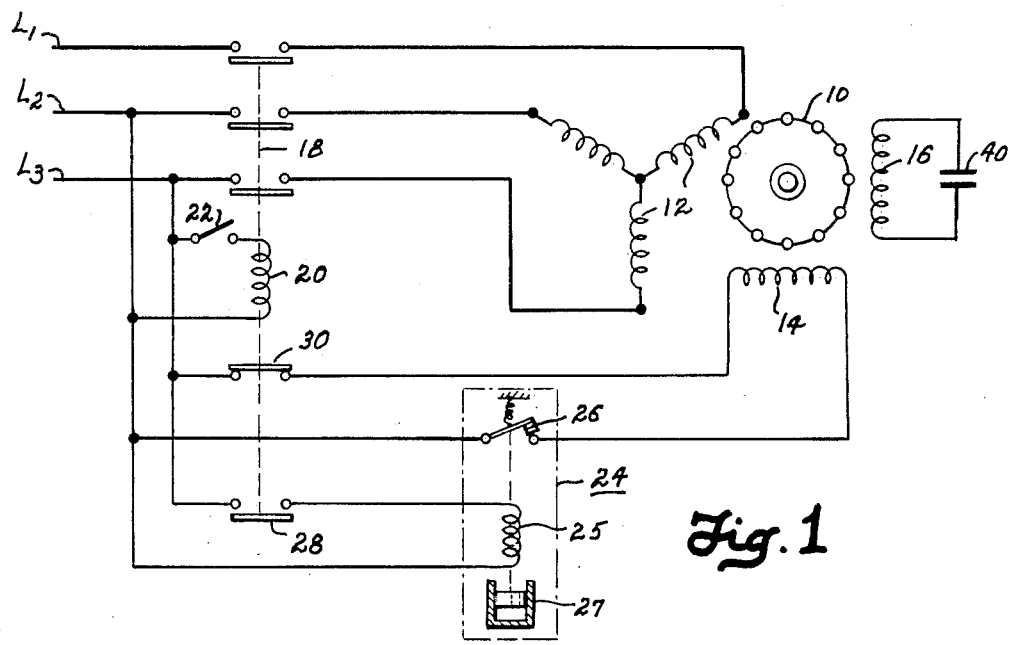

Jan. 27, 1953          S. NOODLEMAN          2,627,059

MOTOR CONTROL

Filed June 14, 1950

INVENTOR.
SAMUEL NOODLEMAN.
BY *Dybvig & Dybvig*
*His Attorneys*

Patented Jan. 27, 1953

2,627,059

UNITED STATES PATENT OFFICE 2,627,059

MOTOR CONTROL

Samuel Noodleman, Dayton, Ohio, assignor to Louis R. Mahrt and D. Robert Laughter, as trustees for Standard Dayton Corporation, Dayton, Ohio, a corporation of Ohio Application June 14, 1950, Serial No. 167,943

16 Claims. (Cl. 318—211)

This invention relates to a motor control and more particularly to a control for use in applying a braking effect.

It is an object of this invention to provide a motor with an improved form of electric brake which is smooth and quiet in operation.

Another object of this invention is to provide a brake arrangement which may be manufactured cheaply and which has no parts which are subject to wear.

Still nother object of this invention is to provide an improved type of brake wherein at zero speed of the motor there is substantially zero braking effect.

Still another object of this invention is to provide a brake which is easy to operate.

More particularly, it is an object of this invention to superimpose upon the standard windings of a motor a single phase winding having a larger number of poles than the standard motor winding for use in electrically braking the motor after the power to the main winding has been cut off.

I have found that by placing a first single phase winding in the slots of the stator and arranging this winding so as to produce a greater number of poles than produced by the main winding, the deenergization of the main winding followed by the energization of the single phase winding tends to very quickly reduce the speed of the motor. I have also found that by placing a second single phase winding 90° out of phase with the first single phase winding and connecting this winding to a condenser so as to form a resonant circuit, the second winding will increase the braking effect of the first winding whereby the combined effect of the two windings is to bring the motor to a quick stop and to give the motor zero torque at zero speed.

Other objects and advantages reside in the construction of parts, the combination thereof and the mode of operation, as will become more apparent from the following description.

Figure 2:
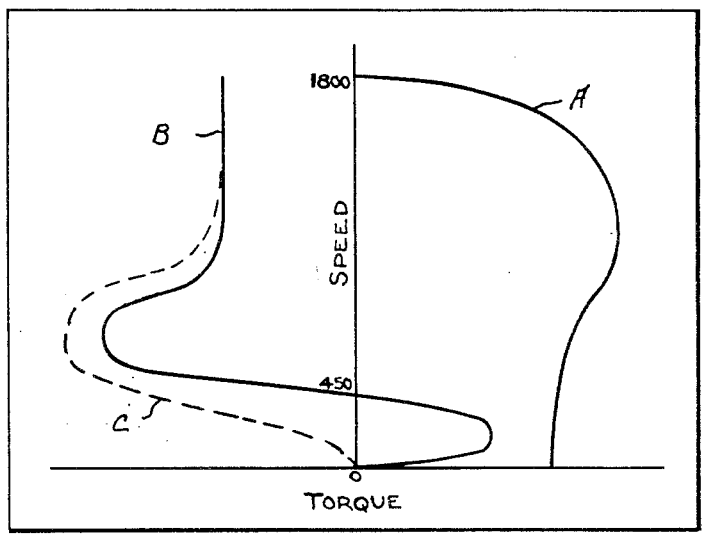

In the drawing:

Figure 1 is a schematic circuit diagram showing my invention applied to a three phase squirrel cage motor; and Figure 2 shows a graph for illustrating the speed torque curves for the main motor winding and the braking winding.

For purposes of illustrating my invention, I have shown the same applied to a conventional three phase, Y connected, squirrel cage motor, whereas the invention is equally applicable to other types of dynamoelectric machines, such as single phase motors, three phase delta motors, motors having wound rotors, and is even applicable to generators where it is desired to apply a brake effect to the generator to bring it to a quick stop.

Referring now to the drawing wherein I have shown a preferred embodiment of my invention, reference numeral 10 designates the squirrel cage rotor arranged to operate in a magnetic field produced by the three phase stator winding 12. Insofar as the stator winding 12 and the rotor 10 are concerned, these normally operate like any other three phase squirrel cage motors.

In addition to the conventional stator winding 12, which may be referred to as the main winding, there is provided a single phase auxiliary braking winding 14 and an auxiliary resonating or shorted winding 16. The winding 12 is arranged to be connected to the power lines $L_1$, $L_2$ and $L_3$ by means of a conventional three pole switch 18 under control of the solenoid 20. When it is desired to start the motor, a starting control switch 22 is closed so as to energize the solenoid 20 and thereby close the switch 18, in accordance with well known practice.

The winding 14, in combination with the winding 16, forms a two phase winding which is adapted to be directly placed in the same slots provided for the main stator winding 12. However, the arrangement of the windings 14 and 16 is such as to establish a field having a larger number of poles than the number of poles produced by the main stator winding 12 for a purpose to be explained more fully hereinafter. By virtue of this arrangement of the windings, it is obvious that the synchronous speed of the motor when energized solely by the windings 12 may be two or more times as great as the synchronous speed of the motor when energized solely through the winding 14, with the result that a switch-over from the energization of the main windings 12 to the energization of the winding 14 will immediately produce a braking effect.

The winding 16 is arranged so as not to have any induced voltage caused by flow of current through the main winding 12. Normally this may be accomplished by making this an even number of poles for each regular pole set up by the winding 12. Thus, if the main winding 12 comprises a four pole winding, the winding 16 would be an 8, 16 or 24 pole winding or any other even multiple of 4. The larger the number of poles established by the braking winding, the greater will be the tendency for the braking winding to reduce the motor speed.

The control circuit shown in Figure 1 is arranged so that the winding 14 is never energized when the winding 12 is energized and vice versa, but the instant the switch 22 is opened, the braking winding 14 is energized for a predetermined period of time sufficient to bring the motor to a stop.

For purposes of illustration, I have shown a timer device 24 for use in controlling the switch 26. The timer 24 includes a solenoid 25 which is arranged in series with a timer control switch 28 which automatically energizes the solenoid 25 upon closing of the switch 22. As illustrated, the switch 28 is operated by the solenoid 20 and is arranged to be closed when the motor is started and remains closed at all times until the switch 22 is opened, at which time the switch 28 deenergizes the solenoid 25 of the timer 24, which in turn deenergizes the switch 26 after a predetermined time delay sufficient to allow the brake circuit to bring the motor to a stop. For purposes of illustration, I have shown a conventional time delay switch in which the time delay is provided by the dash pot 27 which retards the opening of the switch 26, whereas other types of time switches could be used.

It will be noted that the solenoid 20 also operates the switch 30 which remains closed at all times when the solenoid 20 is deenergized and which opens immediately when the solenoid 20 is energized so as to prevent the flow of current through the braking winding 14 when 12 is energized.

As indicated in the drawing, a condenser 40 has been placed directly across the resonating winding 16 so as to form a resonant circuit. By virtue of this arrangement, the resonating winding 16 tries to generate a maximum current and this in turn tends to kill or neutralize the field generated by the rotor flux in response to energization of the braking winding 14. If it were not for the resonating winding 16, the braking winding 14 would tend to keep the motor operating as a single phase motor but at a reduced speed. The resonating winding 16 prevents the braking winding 14 from thus continuing to operate the motor as a single phase motor.

It should be noted that the voltage on the condenser 40 is zero at zero motor speed, even though the winding 14 is energized. As the rotor approaches the speed corresponding to the synchronous speed of a motor having the same number of poles as winding 14, the condenser voltage becomes maximum. Above this speed the condenser voltage drops very rapidly and approaches zero at the normal rated speed of the motor. By virtue of this fact, the condenser may be an inexpensive, light duty, electrolytic type such as used in single phase motor starting circuits, et cetera.

Referring now to Figure 2 of the drawing, the curve A designates the normal speed torque curve of the motor when energized solely by the main winding 12. The curve B designates the speed torque curve of the braking winding 14. The solid line portion of the curve B designates the speed torque curve of a motor in which the resonating winding 16 has been omitted. By adding the resonating winding 16 and the condenser 40, the lower portion of the curve B assumes the shape indicated by the dotted line C. It is obvious from this that the total effect of the windings 14 and 16 is to bring the speed of the motor to zero rather than to allow the motor to operate at a reduced speed approximating the synchronous speed of a motor having only a winding similar to the winding 14.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a motor, a stator, a rotor, said stator having a main winding arranged to establish a given number of magnetic poles, said stator having an auxiliary two phase brake winding arranged to establish a number of poles in excess of said given number, means for shorting one phase of said brake winding, first switch means for controlling the energization of said main winding, second switch means for controlling the energization of the second phase of said auxiliary brake winding, and means for opening said first switch means and for closing said second switch means for braking the motor.

2. In a motor, a stator, a rotor, said stator having a main winding arranged to establish a given number of magnetic poles, said stator having an auxiliary two phase brake winding arranged to establish a number of poles in excess of said given number, first switch means for controlling the energization of said main winding, second switch means for controlling the energization of one phase of said auxiliary brake winding, and means for opening said first switch means and for closing said second switch means for braking the motor, the other phase of the brake winding including electrical damping means for eliminating the tendency of the said one phase of the auxiliary brake winding to continue the operation of the motor at low speeds.

3. In a motor, a stator, a rotor, a main stator winding arranged to establish a given number of poles, a brake winding arranged to establish a greater number of poles, first switch means for controlling the energization of said main winding, second switch means for controlling the energization of said brake winding, means for opening said first switch means and for closing said second switch means for braking the motor, a shorting winding arranged 90 electrical degrees out of phase with said brake winding, and a capacitor connected across the terminals of said shorting winding so as to form with the shorting winding a resonant circuit for increasing the braking action of said brake winding.

4. In an alternating current motor; a stator; a squirrel cage rotor; said stator having a three phase winding for energizing the motor; and means for applying a braking effect to said motor comprising a first single phase auxiliary winding, a second single phase auxiliary winding arranged in noninductive relationship to said three phase winding, and means for shorting said second auxiliary winding including a condenser, said second auxiliary winding being arranged 90 electrical degrees out of phase with said first auxiliary winding so as to increase the braking effect of said first named winding.

5. In an alternating current motor; a stator; a squirrel cage rotor; said stator having a three phase winding for energizing the motor; and means for applying a braking effect to said motor comprising a first single phase auxiliary winding, a second single phase auxiliary winding arranged in noninductive relationship to said three phase winding, and means for shorting said second auxiliary winding including a condenser, said second auxiliary winding being arranged 90 electrical degrees out of phase with said first auxiliary winding so as to increase the braking effect of said first named winding, said first named auxiliary winding being arranged to establish a greater number of poles than established by said three phase winding.

6. In a motor, a rotor, a stator having a main winding arranged to establish a given number of magnetic poles, an auxiliary two phase winding arranged on said stator so as to establish a number of magnetic poles in excess of said given number, first switch means for controlling the energization of said main winding, second switch means for controlling the energization of one phase only of said auxiliary winding, means for shorting the other phase of said auxiliary winding, means for substantially simultaneously opening said first switch means and for closing said second switch means, and means responive to energization of said auxiliary winding through said second switch means for opening the circuit to said auxiliary winding after a predetermined time interval.

7. In a motor, a rotor, a stator having a main winding arranged to establish a given number of magnetic poles, an auxiliary two phase winding arranged to establish a number of poles in excess of the number of poles established by said main winding, first means for controlling the energization of said main winding, second means for controlling the energization of one phase only of said auxiliary winding, means for shorting the other phase of said auxiliary winding, a solenoid for operating said first and second named means in unison, said first and second named means being so constructed and arranged that only the main winding or the auxiliary winding can be energized at any one time, and means responsive to energization of said auxiliary winding for opening the circuit to said auxiliary winding after a predetermined time delay.

8. In a motor, a rotor, a stator having a main three phase winding arranged to establish magnetic poles, a single phase winding carried by said stator arranged to establish a number of poles in excess of the number of poles established by said three phase winding, first switch means for controlling the energization of said main winding, second switch means for controlling the energization of said single phase winding, a second single phase winding, means for shorting said second single phase winding, a common operator for said first and second switch means arranged to open one of said switch means as the other of said switch means closes, and means responsive to energization of said single phase winding for opening the circuit to said single phase winding after a predetermined time delay.

9. In a motor, a rotor, a stator having a main three phase winding arranged to establish magnetic poles, a first single phase winding carried by said stator arranged to establish a number of poles in excess of the number of poles established by said three phase winding, first switch means for controlling the energization of said main winding, second switch means for controlling the energization of said first single phase winding, a common operator for said first and second switch means arranged to open one of said switch means as the other of said switch means closes, means responsive to energization of said first single phase winding for opening the circuit to said first single phase winding after a predetermined time delay, a second single phase winding arranged in non-inductive relationship to said three phase winding, and condenser means connected across said second single phase winding so as to form with said second single phase winding a resonant circuit.

10. In a motor, a stator, a rotor, said stator having a main winding arranged to establish a given number of magnetic poles, said stator having an auxiliary two phase brake winding arranged to establish a number of poles in excess of the said given number of the main winding, one phase of the auxiliary two phase winding permanently short-circuited through a capacitor, first switch means for controlling the energization of said main winding, second switch means for energization of one phase of the auxiliary brake winding, and means for opening said first switch means and for closing said second switch means for braking the motor, said short-circuited winding functioning as an electrical damping means for eliminating the tendency of said brake winding to continue the operation of the motor at low speeds.

11. In a motor, a stator, a rotor, said stator having a main winding arranged to establish a given number of magnetic poles, said stator having an auxiliary two phase brake winding arranged to establish a number of poles in excess of said given number, one of said brake windings being permanently short-circuited and so arranged with respect to the main winding that when the motor is energized by the main winding the voltages generated in the short-circuited winding as a result of the flux set up by the rotation of the rotor is neutralized, first switch means for controlling the energization of said main winding, second switch means for controlling the energization of the second phase of said auxiliary brake winding, and means for opening said first switch means and for closing said second switch means to energize said second phase winding to reduce the speed of the motor, then the first phase winding at and near synchronous speed of the second phase winding neutralizing the effectiveness of the second phase winding to thereby stop the motor.

12. A motor according to claim 11, wherein the closed circuit of the first phase brake winding is tuned to a frequency substantially equal to the frequency of the induced currents in the rotor when the rotor rotates at the synchronous speed of the second brake winding.

13. A motor according to claim 11, wherein the natural frequency of the short-circuited brake phase winding is only a fraction of the natural frequency of the currents induced by the rotor when operating at synchronous speed when energized by the main windings.

14. In a motor, a stator and a rotor, said stator having a main winding arranged to establish a given number of magnetic poles, said stator having an auxiliary two phase brake winding, one phase of which is noninductively wound with respect to the main winding and permanently short-circuited, said auxiliary winding being so wound as to establish a given number of magnetic poles in excess of the number of magnetic poles established by the main winding.

15. In a motor according to claim 14, wherein the short-circuited winding is short-circuited through a condenser.

16. In a motor according to claim 14, wherein the short-circuited winding is shorted through a condenser, the winding and the condenser having a natural frequency which is a small fraction of the frequency of the power input voltage.

SAMUEL NOODLEMAN.

REFERENCES CITED

The following references are of record in the file of this patent:

UNITED STATES PATENTS

| Number | Name | Date |
| --- | --- | --- |
| 2,196,402 | Snyder | Apr. 9, 1940 |
| 2,205,252 | Graham | June 18, 1940 |
| 2,510,468 | Fuge | June 6, 1950 |